May 22, 1928.

L. W. EGGLESTON

RELIEF VALVE

Filed May 29, 1924

INVENTOR.
Lewis W. Eggleston
BY
ATTORNEY.

May 22, 1928.

L. W. EGGLESTON

RELIEF VALVE

Filed May 29, 1924

INVENTOR.
Lewis W. Eggleston
BY
his ATTORNEY.

Patented May 22, 1928.

1,670,615

UNITED STATES PATENT OFFICE.

LEWIS W. EGGLESTON, OF BUFFALO, NEW YORK, ASSIGNOR TO AMERICAN RADIATOR COMPANY, OF NEW YORK, N. Y., A CORPORATION OF NEW JERSEY.

RELIEF VALVE.

Application filed May 29, 1924. Serial No. 716,544.

My invention relates to new and useful improvements in pressure relief valves, and more particularly to that character or type wherein a valve member cooperates with a relief port to normally maintain the same closed, but is operable to open the port upon the existence of a predetermined pressure to thereby relieve such pressure until the latter is reduced to a point desired. In prior devices of this character of which I am aware, it has been usual to yieldingly hold the valve in closed position by suitable means, for example, a spring or weight which is adjustable to yield at a predetermined pressure to permit the valve to open to relieve the pressure, the valve automatically returning to closed position upon the required reduction of pressure. The operation of these prior devices has been uncertain for the reason that the valve may stick to its seat and thus add further resistance in addition to the predetermined resistance of the spring or weight, so that the predetermined pressure for which the device is set will be insufficient to overcome the total resistance and the valve cannot be moved to open the port to relieve the pressure; for example, it sometimes occurs that incrustation or deposits from substances contained in or carried by the water will so effectively cement or seal the valve to its seat as to prevent completely the intended functioning of the valve.

The primary object of my present invention is, therefore, to provide an improved relief valve which will normally function to relieve pressure when it reaches a predetermined point, but will also embody efficient means for assuring opening of the valve in the event the latter be held to its seat by abnormal conditions preventing its intended or normal operation.

The invention consists in the improved construction and combination, to be more fully described hereinafter, and the novelty of which will be particularly pointed out and distinctly claimed.

In the accompanying drawings, I have fully and clearly illustrated a preferred embodiment of my invention, and in which drawings—

Fig. 4 is a detail top plan view of a valve casing, and

Fig. 5 is a detail sectional view on the line 5—5 of Fig. 2.

Figure 1:
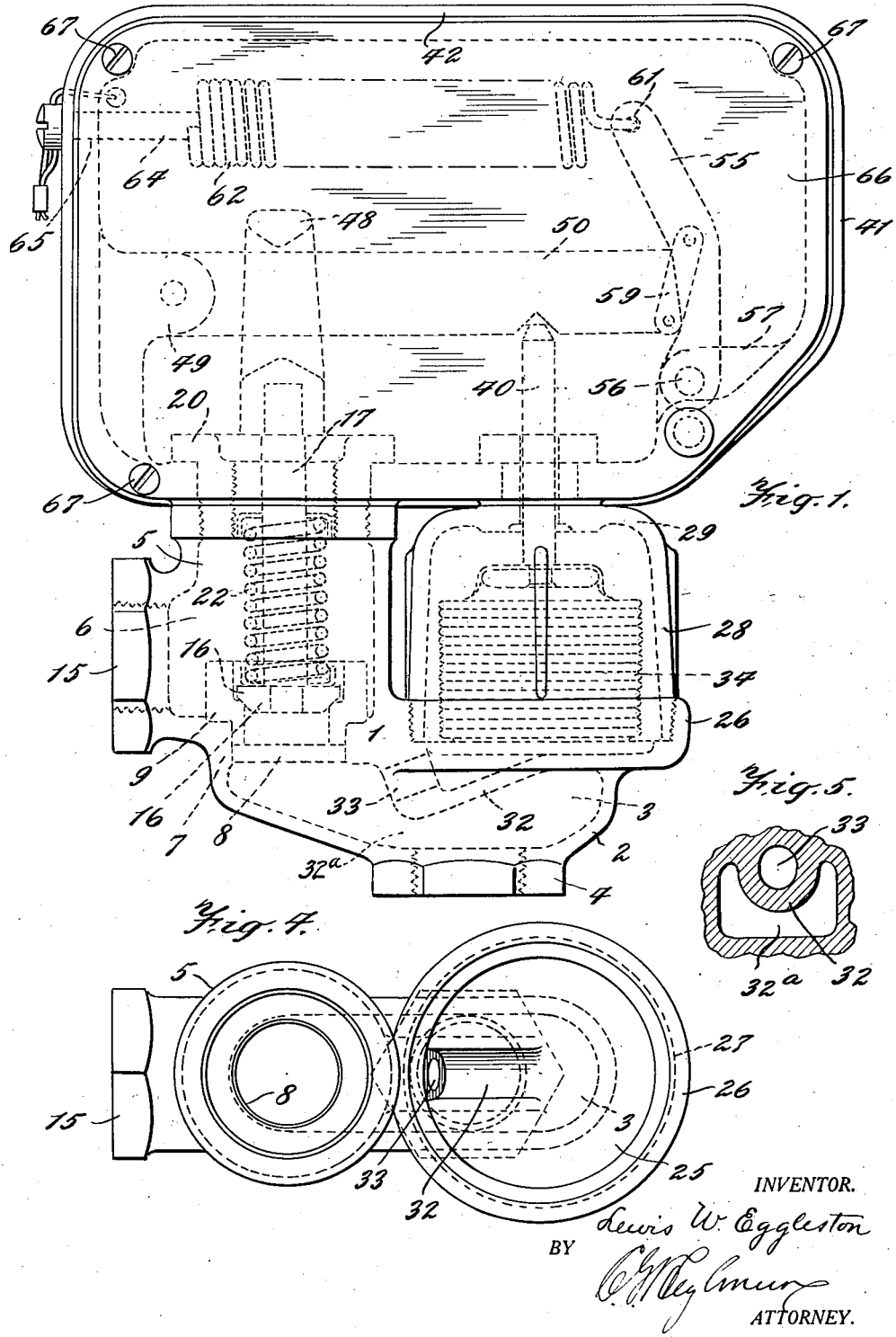
Figure 1 is a view in side elevation. the internal parts being shown in dotted lines.

Referring to the drawings by characters of reference, 1 designates a valve body or casing including a base portion 2 containing a chamber 3, the wall of said portion having an apertured, internally threaded coupling member or nipple 4 adapted to be connected in any suitable manner to a boiler, steam chamber, water, or steam pipe (not shown), in fact, to any space in which a pressure, liquid or gaseous, is likely to exist, said space communicating through the nipple with the chamber 3, so that the same pressure will exist in said chamber as is in said space.

Rising from one side or end of said base portion is a cylindrical body 5 forming a valve chamber 6, which is separated from the chamber 3 by a partition or web 7 having a port 8 permitting communication between said chambers, and said partition supporting a valve seat 9. The valve seat may take a number of forms without departing from my invention, but preferably consists of an annular cup-shaped member having a shoulder 10 adapted to rest on the upper surface of the partition 7, and provided with a reduced neck 11 adapted to seat in and fit snugly the port 8, whereby the seat is held in position. The valve seat is provided with a port or opening 12 surrounded by a seat 13, and the inner wall of the cup-shaped portion is provided with inwardly directed webs or lugs 14 to serve as valve-centering devices, as will presently appear. The chamber 6 is provided with an internally threaded outlet nipple 15 leading to any suitable point, and through which the exhaust may take place.

Arranged within the valve seat is a bevelled valve disc 16 adapted to cooperate with the seat 13, heretofore mentioned, to control the port 8. The valve is carried by a stem 17 constituting an operating member, which projects upward through an opening in a plug 18 adjustably threaded, as at 19, in a central opening through a closure cap 20, threaded, as at 21, into the upper end of the wall 5. Surrounding the stem 17 is an expansion spring 22, the opposite ends of which are seated in spring seats 23, 24 located, respectively, on the stem adjacent the plug 18 and the valve 16, whereby the spring normally exerts its force expansively to urge the valve toward closed position relative to the port 8. The force or resistance of the spring may be regulated to any desired predetermined degree by adjusting the plug 18 in the opening through the closure 20, so that the valve may be set to blow off at any predetermined pressure, liquid or gaseous, existing within the chamber 3. It will be readily understood that the spring normally holds the valve in closed position and exerts a predetermined resistance to the pressure exerted on the under face of the valve, so that the valve will open against the force of the spring when the fluid pressure, liquid or gaseous, on the valve increases slightly over the resistance offered by the spring. If it is desired the pressure in the system shall not rise above—say, 50 pounds, the spring will be set to offer 50 pounds resistance per square inch of valve opening, so that the valve will open when the pressure in the system slightly exceeds that resistance, whereby the pressure will be relieved.

As heretofore stated, it sometimes occurs that deposits or incrustations formed at or about the valve seat will result in the valve sticking or being cemented to its seat, so that the determined pressure at which the valve is to operate will not be sufficient to overcome the additional resistance thus produced. In other words, although the spring may offer a resistance of—say, approximately 50 pounds per square inch of valve opening, the incrustation may so securely hold the valve, or interfere with its operation, as to require a force of—say, 100 pounds, or even more, in order to open the valve. Under such conditions it will be readily understood that the pressure in the system might build up to a dangerous point, in view of the fact that the valve would not function to relieve the pressure.

I will now describe novel and efficient means for exerting sufficient force on the valve to move it from closed relation to the relief port, in the event that failure of the valve to open should result in an abnormally high pressure in the system: In the preferred embodiment shown and to be hereinafter described, this provision comprises a power-multiplying means operable by an increased pressure in the system above that at which the safety or relief valve is set to normally function. In the drawings, the top portion of the body 2 is closed by a wall or partition 25 located at one side of the body 5 heretofore described, and surrounded by an annular flange 26 internally threaded, as at 27, to receive the lower threaded end of an inverted cup-shaped chamber comprising a substantially cylindrical wall 28 closed at its upper end by a top or end wall 29 having a central nipple 30, through which is an opening 31, for a purpose to be presently described. The wall or partition 25 is provided with a depressed or downwardly extending portion constituting a channel or pocket 32 opening through an inclined port 33 into the chamber 3, said inclined portion and port being directed toward the passage leading through the body 3 to the under side of the valve 16 heretofore described. The lower end of the part 32 closely approaches that portion of the wall 2 which is adjacent nipple 4, so as to provide a somewhat restricted passage $32^a$ leading from the inlet nipple 4 toward the valve port 8, for a purpose to be presently described.

Within the chamber 28 is arranged a pressure-responsive, expansible-collapsible power element 34, preferably in the form of a cylindrical metallic shell or bellows having its wall annularly corrugated, whereby said element is expansible and contractible lengthwise. The element 34 is open at its lower end, and the periphery of its side wall is connected to the inner edge of an annular plate 35, the outer edge of which is clamped between the lower end of the wall 28 and the top portion of the casing 2 within said flange 26, whereby the expansible-collapsible element is rigidly and securely held and sealed in position so that the interior thereof communicates through port 33 with chamber 3, and the same pressure will exist within said element as exists in said chamber 3. It will be seen that the interior of the element 34 is at all times in communication with the chamber 3 and exposed to the fluid pressure existing therein. The upper end of the element 34 is closed by an integral end wall or head 37, and within the element is a rigid disc 38 located in contact with the head 37 and held rigidly in place by crimping or spinning the wall of the latter around and beneath the circumferential edge of said disc. Suitably secured to said disc 38 and projecting through a central opening in the head 37 is a power transmission member, preferably in the form of a plunger rod or stem 40, by which motion is transmitted from the element 34 to the auxiliary, power-multiplying, valve-opening means, as will be presently described.

Mounted above the body 5 and casing 28 just described, is a supporting frame comprising vertical side members 41, a top member 42, and a base member 43, the latter having apertures 44, 45 through which project the closure 20, and the neck or extension 30 heretofore described. The closure 20 is provided with an overhanging flange 20ª which, when the closure is screwed down into position, clamps the base member 43 against the top of the body 5, and the nipple 30 on the casing 28 is made to project above the upper edge of the part 43 and is threaded to receive a clamping nut 30ª, whereby the adjacent portion of member 43 is clamped against the head 29 heretofore described.

The outer end of the stem 17 heretofore described projects into the space bounded by the supporting frame above described, and is threaded, as at 46, into a socket 47 in the base of a loop or yoke 48, whereby the latter moves vertically with said stem.

Figures 2, 3:
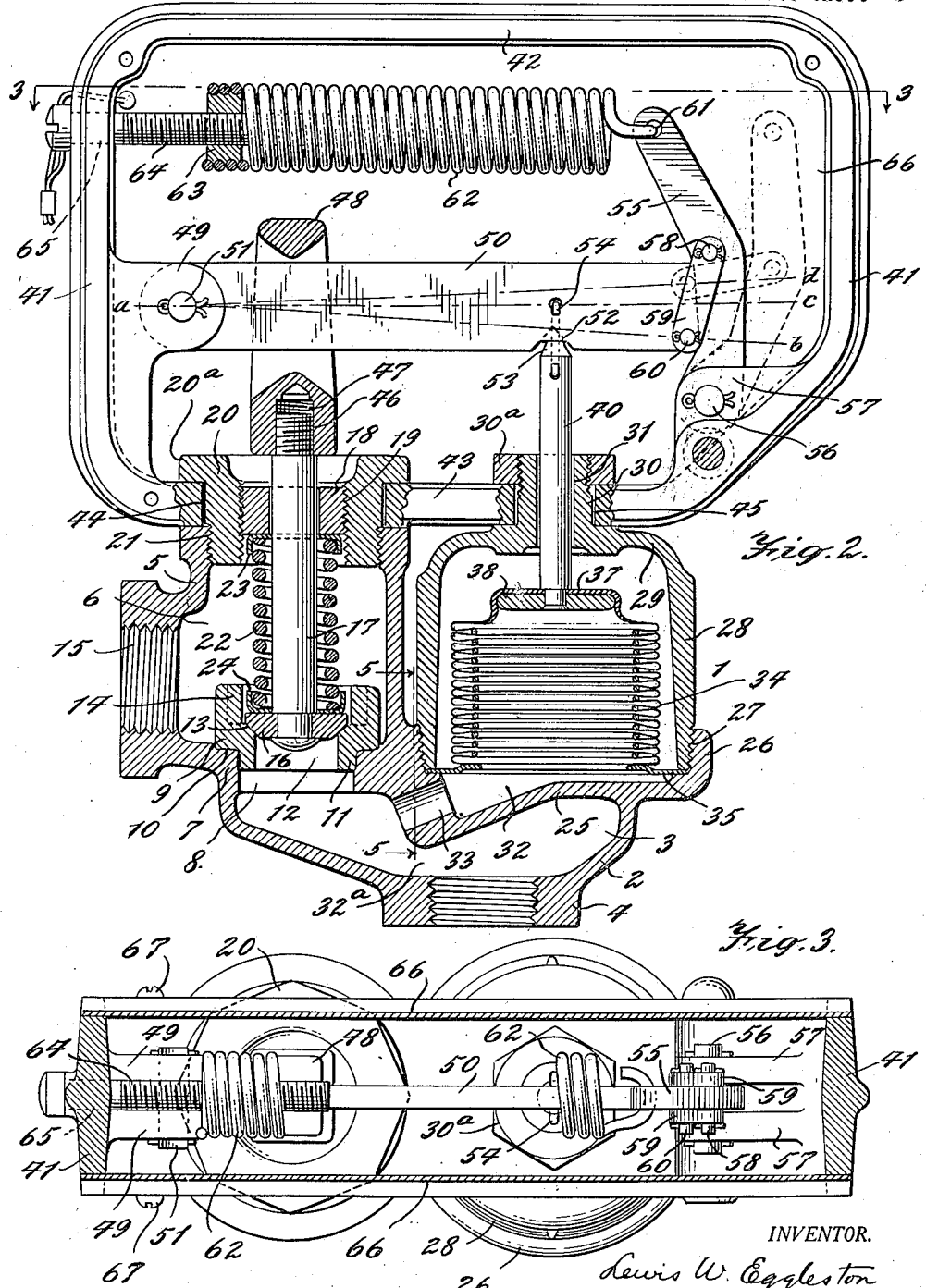
Fig. 2 is a view similar to Fig. 1, but showing certain cover-plates removed, and also showing certain parts in vertical central section.
Fig. 3 is a sectional view on the line 3—3 of Fig. 2.

The vertical frame member 41, located adjacent the body 5, is provided with an internally projecting pair of spaced ears 49 constituting a fulcrum for the inner end of a lever 50, said lever being connected to said ears by a cross-pin 51. The lever 50 extends horizontally through the opening in the loop or yoke 48 and is of sufficient length to lie over the upper end of the stem 40 heretofore described, the free end of said lever projecting beyond said stem for a desired distance, as clearly shown in Fig. 2 of the drawings. The vertical width of the opening through the yoke 48 is such that the inner upper surface of the yoke closely approximates the upper edge of the lever, but said opening or space beneath the lever is sufficient to provide enough clearance to permit normal operation of the valve at a predetermined pressure without swinging the lever on its fulcrum.

At the point at which the lever 50 overlies the stem 40, said lever is provided with a seat or socket 52 to receive the pointed upper end 53 of said stem 40, said lever and stem being preferably connected also by means of a link 54, the ends of which are hooked through openings in the lever and stem respectively, whereby said lever and stem move in both directions in unison. It will thus be seen that any pressure exerted within the element 34 tending to expand the same, will exert a force longitudinally of the stem 40 against lever 50 to move the latter vertically and transfer said force to the yoke 48, valve stem 17 and valve 16. It will be seen that the yoke 48 is located between the fulcrum 51 and the point at which stem 40 exerts its force on the lever 50, so that such force will be greatly multiplied at the point where it is exerted on the yoke 48 to lift the valve 16. Thus, a pressure force within element 34 equal to that exerted on the under side of valve 16, will be greatly increased when transmitted to the yoke.

Associated with the lever 50 and the pressure-operated power element 34 is mechanism for regulating the pressure at which said element 34 will be permitted to exert a force to move the lever 50 to thereby open the valve. This mechanism preferably comprises a vertically extending, angular lever 55 located within the supporting frame and having its lower end fulcrumed on a pin 56 located beneath the swinging end of lever 50 and fixed in spaced ears 57, preferably integral with the adjacent side frame member 41. The lever 55 is connected at a point intermediate its ends, as at 58, to one end of a link 59, the other end of which is connected, as at 60, to the swinging end of lever 50, and preferably at a point below the longitudinal center of axis of the latter. The upper end of the lever 55 extends above the lever 50 and is connected, as at 61, to one end of a contractile spring 62, the other end of which is connected to a nut or head 63 having a threaded attachment to an adjusting screw 64 which is rotatably mounted in a suitable bearing 65 in the frame side member 41, said spring extending in a general direction parallel to the axis of lever 50. It will be seen that when the spring 62 is placed under the desired tension by adjustment of the screw 64, said spring will resist upward movement of lever 50, and the force of the spring will be exerted through lever 55 to exert a downward thrust on link 59 to tend to move the lever 50 downward against any upward force exerted by the element 34. The sides of the frame are closed by suitable cover-plates 66 held in place by screws 67 passing through said plates and into the frame.

The parts being constructed and arranged in the preferred embodiment as above described, the operation is as follows: The expansive force of the spring 22 is adjusted by means of the plug 18 to exert a given force on valve 16, so as to maintain the latter closed against unobjectionable pressure within a system, but to permit the valve to open automatically when the pressure reaches a predetermined point at which it is to be relieved. In the event the valve functions freely, and is not held to its seat by incrustation or other abnormal cause, the pressure will be relieved when it reaches the point where it overcomes the resistance of the spring 22. The spring 62 is adjusted so as to exert its force through the intermediate connections to resist expansion of element 34 so that the latter will not be expanded at the pressures normally operating the relief valve 16, but to permit said element to expand when the pressure in the system reaches a predetermined point in excess of that which the spring 22 is set to resist—for example, spring 62 may be set so that the element 34 will not expand until the pressure reaches 75 pounds. If the valve 16 does not function, due to the abnormal causes—for example, such as heretofore stated—the pressure in the casing and in the expansible element 34 builds up until it is sufficient to overcome the force exerted by the spring 62, at which point the element 34 will lift the lever 50 until its upper edge contacts the top member of loop 48, in which position the lever will have moved so that the line of centers a—b will assume the position shown by line a—c, in which the force of the spring 62, due to its arrangement and the connection 59 will be reduced to offer but slight resistance to the force exerted by expansion of member 34, whereby said force will be exerted in its practical entirety to lift lever 50 to its extreme upward position. It will be seen that when the parts are being moved to the position shown in dotted lines in Fig. 2, the force of the spring 62 instead of being exerted downward in substantial entirety on lever 50, will, due to angular arrangement of lever 50, link 59 and lever 55, be transmitted in a general direction lengthwise of said lever 50, thereby reducing the resistance of the spring to the thrust of the element 34, so that the latter exerts a large proportion of its entire force upon lever 50 to open the valve. Due to the arrangement and location of the parts, as heretofore described, this force will be greatly multiplied at the point where it is applied to the yoke 48 and the valve stem. By this operation the lifting force applied to the stem 17 will be greatly in excess of the resistance afforded by spring 22, and any incrustation which may be holding the valve closed, and the valve is thereby lifted forcibly from its seat to relieve the pressure in the system. As soon as the pressure is relieved in the system and is reduced to a point below that at which the spring 22 is set to operate, said spring will move the valve to its seat to prevent further flow through the relief port, and spring 62 will exert its force to return the lever 55, link 59, lever 50 and element 34 to the position shown in full lines in Fig. 2.

The operation just described of returning the parts to normal set position is possible because when the power-multiplying means functions to lift the valve, the connection 60 for link 59 comes to rest below a line passing through the centers of fulcrums 51 and 58, so that whatever power is stored in spring 62 will be sufficient to return the connected parts to normal position.

The channel 32 and opening 33 not only affords access for the pressure to the element 34, but also because of its inclination and location adjacent to the passage 32ª, acts in the nature of an ejector nozzle, whereby when the valve 16 opens, the flow of fluid past the lower end of opening 33 will serve to reduce the pressure in element 34, so that when the pressure is reduced to the desired point in the system the spring 22 will act promptly to close the valve 16.

In the appended claims the terms "fluid pressure" and "fluid-pressure-responsive", wherever they occur, are intended to include any pressure which may exist, whether the same be liquid or gaseous.

What I claim and desire to secure by Letters Patent of the United States is:

1. A pressure relief valve comprising a casing having a relief port, a valve cooperable with said port and normally closing the same, a lever pivoted in the casing, an operating member for said valve and connected to said lever, yielding means normally urging said valve closed and permitting the valve to open at a predetermined fluid pressure, a fluid pressure-responsive element operatively connected to said lever and adapted to exert force thereon, a lever fulcrumed in the casing, a spring connected to said last-named lever to move the same in one direction, and means operatively connecting said levers whereby said spring opposes the movement of said fluid pressure-responsive element.

2. A pressure relief valve comprising a casing having a relief port, a valve cooperable with said port and normally closing the same, a lever pivoted in the casing, an operating member for said valve and connected to said lever, yielding means normally urging said valve closed and permitting the valve to open at a predetermined fluid pressure, a fluid pressure-responsive element operatively connected to said lever and adapted to exert force thereon, a lever fulcrumed in the casing, a spring connected to said last-named lever to move the same in one direction, and a link pivotally connecting said levers whereby said spring opposes the movement of said fluid pressure-responsive element.

3. A pressure relief valve comprising a casing having a relief port, a valve cooperable with said port and normally closing the same, a valve operating member, a yielding means urging said valve to close said port in opposition to fluid pressure exerted thereon, a fluid pressure-responsive element, power-multiplying connections between said element and said operating member to automatically open said valve in event a predetermined pressure on said valve is insufficient to open the same, and resilient means for determining the point at which said element responds to pressure.

4. A pressure relief valve comprising a casing having a relief port, a valve cooperable with said port and normally closing the same, a valve operating member, a yielding means urging said valve to close said port in opposition to fluid pressure exerted thereon, a fluid pressure-responsive element, power-multiplying connections between said element and said operating member to automatically open said valve in event a predetermined fluid pressure on said valve is insufficient to open the same, resilient means for determining the point at which said element responds to pressure, and means for regulating the resistance of said resilient means to regulate the point at which said element responds to pressure.

5. A pressure relief valve comprising a casing having a relief port, a valve cooperable with said port and normally closing the same, a lever, an operating member for said valve and connected to said lever, yielding means normally urging said valve closed and permitting the valve to open at a predetermined fluid pressure, a fluid pressure-responsive element arranged to exert force on said lever at a greater distance from its fulcrum than the connection between the lever and said operating member, and means for regulating the point at which said fluid pressure-responsive element responds to pressure without varying the load on said valve.

6. A pressure relief valve comprising a casing having a relief port, a valve cooperable with said port and normally closing the same, a lever, an operating member for said valve and connected to said lever, yielding means normally urging said valve closed and permitting the valve to open at a predetermined fluid pressure, a fluid pressure-responsive element exerting force on said lever at a greater distance from its fulcrum than the connection between the lever and said operating member, resilient means opposing the movement of said element to actuate said lever, and means connecting said resilient means and lever whereby the resistance of said resilient means is reduced upon response of said element to a predetermined pressure.

7. A pressure relief valve comprising a casing having a relief port, a valve cooperable with said port and normally closing the same, a lever, an operating member for said valve and connected to said lever, yielding means normally urging said valve closed and permitting the valve to open at a predetermined fluid pressure, a fluid pressure-responsive element arranged to exert force on said lever at a greater distance from its fulcrum than the connection between the lever and said operating member, a spring located to one side of said lever and extending in a general direction longitudinally of said lever, a lever having a fulcrum on the opposite side of said first-named lever from said spring, said second lever being connected to said spring, and a link connection between said levers whereby said spring opposes the movement of said fluid pressure-responsive element.

8. A pressure relief valve comprising a casing having a relief port, a valve cooperable with said port and normally closing the same, a lever, an operating member for said valve and connected to said lever, yielding means normally urging said valve closed and permitting the valve to open at a predetermined fluid pressure, a fluid pressure-responsive element exerting force on said lever at a greater distance from its fulcrum than the connection between the lever and said operating member, a spring located to one side of said lever and extending in a general direction longitudinally of said lever, a lever having a fulcrum on the opposite side of said first-named lever from said spring, said second lever being connected to said spring, a link connection between said levers whereby said spring opposes the movement of said fluid pressure-responsive element, and means to regulate the power of said spring.

9. A pressure relief valve comprising a casing, a valve chamber and a pressure chamber communicating with said casing, a valve controlling flow from the casing through the valve chamber, a stem connected to said valve, a spring urging the valve to closed position and permitting the valve to open at a predetermined fluid pressure exerted thereon, a fluid pressure-responsive element in said pressure chamber, power-transmitting means connected to said element, a lever fulcrumed on the casing, said stem and power-transmitting means being connected with said lever, the connection for said means being further than the stem connection from the fulcrum for said lever, a second lever fulcrumed at a point below said first-named lever and having its swinging end extending above the latter, a link connection between said levers, and a contractile spring arranged above said first-named lever and exerting its force along a line substantially parallel to the first-named lever, one end of said spring being anchored and the other end being secured to said second lever.

10. A pressure relief valve comprising a casing having a relief port, a valve normally closing said port but adapted to respond to a predetermined fluid pressure to open said port, a fluid pressure-responsive element exposed to fluid pressure in said casing, power-multiplying means for transmitting movement from said element to said valve to open the latter, and means whereby flow through said relief port creates an ejector action to reduce pressure on said pressure-responsive element.

11. A pressure relief valve comprising a casing having a relief port, a valve normally closing said port but adapted to respond to a predetermined fluid pressure to open said port, a fluid pressure-responsive element exposed to fluid pressure in said casing, power-multiplying means for transmitting movement from said element to said valve to open the latter, and a partition separating said element from said casing, said partition including a part forming with the wall of the casing a restricted passage and having a port therethrough so located that the flow from the casing through said restricted passage has an ejector action to reduce the pressure on said element.

12. A pressure relief valve comprising a casing having a relief port, a valve cooperable with said port and normally closing the same, an operating member for said valve, yielding means normally urging said valve closed and permitting the valve to open at a predetermined fluid pressure, power-multiplying means responsive to a higher predetermined fluid pressure, and a connection between said power-multiplying means and said operating member permitting movement of said operating member independently of the power-multiplying means upon opening of said valve at said first-named fluid pressure, but connecting the power-multiplying means to said operating member to open the valve at the higher predetermined fluid pressure.

13. A pressure relief valve comprising a casing having a relief port, a valve cooperable with said port to close the same, said valve having an operating member, fluid pressure responsive means, means interconnecting said operating member and said pressure means, said pressure means acting through said interconnecting means at a predetermined fluid pressure to open said valve, and means normally closing said valve and permitting said valve to open at a fluid pressure less than said predetermined pressure, said valve opening at said lesser pressure independently of movement of said interconnecting means.

In testimony whereof I have hereunto subscribed my name.

LEWIS W. EGGLESTON.